United States Patent [19]

Matsumoto et al.

[11] Patent Number: 4,911,427

[45] Date of Patent: Mar. 27, 1990

[54] EXERCISE AND TRAINING MACHINE WITH MICROCOMPUTER-ASSISTED TRAINING GUIDE

[75] Inventors: Tsuyoshi Matsumoto, Kitakatsuragi; Haruhiko Murakami, Hirakata; Masaru Kakumae, Yamatokoriyama; Junzo Kashihara, Kitakatsuragi, all of Japan

[73] Assignee: Sharp Kabushiki Kaisha, Osaka, Japan

[21] Appl. No.: 712,764

[22] Filed: Mar. 18, 1985

[30] Foreign Application Priority Data

| Mar. 16, 1984 | [JP] | Japan | 59-51976 |
| Mar. 23, 1984 | [JP] | Japan | 59-57103 |
| Dec. 10, 1984 | [JP] | Japan | 59-262477 |
| Dec. 25, 1984 | [JP] | Japan | 59-275544 |

[51] Int. Cl.$^4$ .................. A61B 5/04; A63B 21/00
[52] U.S. Cl. .................. 272/73; 213/DIG. 28; 128/689

[58] Field of Search .................. 272/73; 273/DIG. 28; 128/689

[56] References Cited

U.S. PATENT DOCUMENTS

| 4,112,928 | 9/1978 | Putsch | 272/73 |
| 4,278,095 | 7/1981 | Lapeyre | 272/73 |

Primary Examiner—Anton O. Oechsle
Assistant Examiner—Jessica J. Harrison
Attorney, Agent, or Firm—Birch, Stewart, Kolasch & Birch

[57] ABSTRACT

An exercise management machine which measures the individual's pulse and is provided with an indicator to inform the user of an exercise program that is suited to the individual and/or an indicator to inform the individual of the results of exercise, and if possible, an indicator to instruct the user to train according to the prescribed program, from warming up, training to cooling down, and keeps the individual informed of his/her ongoing status.

11 Claims, 21 Drawing Sheets

EXERCISE AND TRAINING MACHINE WITH MICROCOMPUTER-ASSISTED TRAINING GUIDE

BACKGROUND OF THE INVENTION

This invention concerns a exercise management machine in which the amount of exercise is control according to the pulse of the user.

The conventional training bicycle has provision for input of personal data on the user such as sex, age, weight, etc., and target pulse, exercise time, etc., and can display results in accordance with these values (e.g. pulse, elapsed time, distance travelled, etc.).

The conventional jogging management machine has provision for input of the user's target pulse, and it constantly compares this value with the user's actual pulse and displays the difference.

This conventional technology is covered under U.S. Pat. Nos. 3,395,698; 3,675,640; and 4,112,928, etc.

With the above exercise mangement machines, the user inputs his own pulse, exercise time, etc., and his exercise is supervised in accordance with those values, with only a display of results when the user finishes exercising (e.g. volume of exercise, elapsed time, pulse, etc.). With this type of exercise mangement, there was a strong tendency towards either overexercising or underexercising and not attaining the desired results since the exercise program was determined by the user. It is especially difficult for beginners to use the machine since they do not know what type of goals should be set.

Furthermore, there was a strong possibility of a detrimental effect on the user's health since there was no control of the time that was needed to achieve a particular goal, and in many cases the user either proceeded at too fast or too slow a pace.

OBJECT AND SUMMARY OF THE INVENTION

This invention solves the above mentioned problems, by displaying the appropriate exercise program (target pulse, exercise time, etc.) for the individual with a minimal input of personal data (sex, age, weight, etc.), constantly displaying data on the user according to his exercise program, comparing results with past data on exercising, and displaying improvement in physical condition and giving advice on whether present physical condition is good or not.

The other objective on this invention is to provide a suitable program (target pulse, exercise time, etc.) for an individual with a minimum input of personal data (sex, age, weight, etc.), instructing the individual on the appropriate training from warm up to all out training, with detection means to constantly determine the progress of the individual according to his/her training program, to provide for rational training of the individual.

BRIEF DESCRIPTION OF THE DRAWINGS

An outline of a training bicycle is shown in FIG. 1, a jogging management machine in FIG. 2, a front view of an embodiment of this invention in FIG. 3, a block diagram of an outline of the electronic control circuit in FIG. 4, an explanation of the controller in FIG. 5, and flow charts for the functioning of the embodiment of the exercise management machine in FIG. 6 (a) and (b).

DETAILED DESCRIPTION OF THE INVENTION

An embodiment of the invention will now be explained while refering to the figures.

Figure 1:
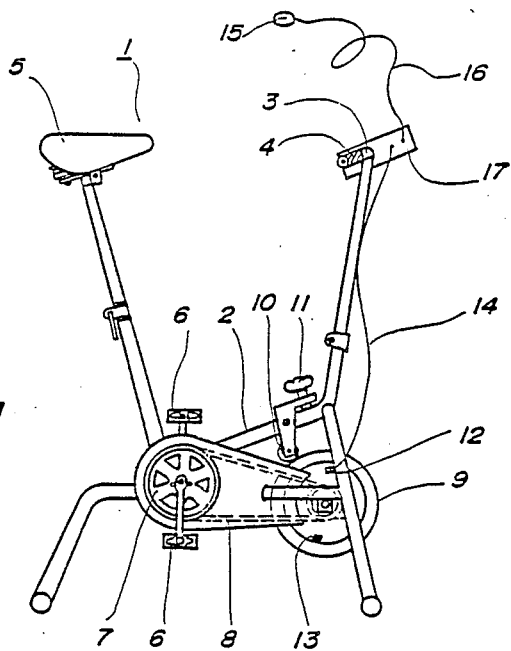

FIG. 1 illustrates an outline of the training bicycle (1), in which (2) is the frame, (3) the handle, (4) the grip, (5) the saddle, (6) the pedal, (7) the gear that is rotated by driving by the pedal by foot, (8) the chain that transmits the rotation of the gear (7) to the wheel (9), (10) the brake supported by the frame (2) which applies the specified pressure to the outer diameter of the wheel (9) that has been set with the brake handle (11), (12) and (13) the rotation sensors which measure rotation by means of for example a hall element and magnet attached respectively to the frame (2) and wheel, opposing each other. (14) is the wire that connects the hall element (12) and the exercise machine body (17), (15) the pulse sensor to determine the pulse of the user which comprises an optical sensor and is fitted in the user's ear, (16) the wire that connects the pulse sensor (15) and the exercise management machine (17).

Figure 3:
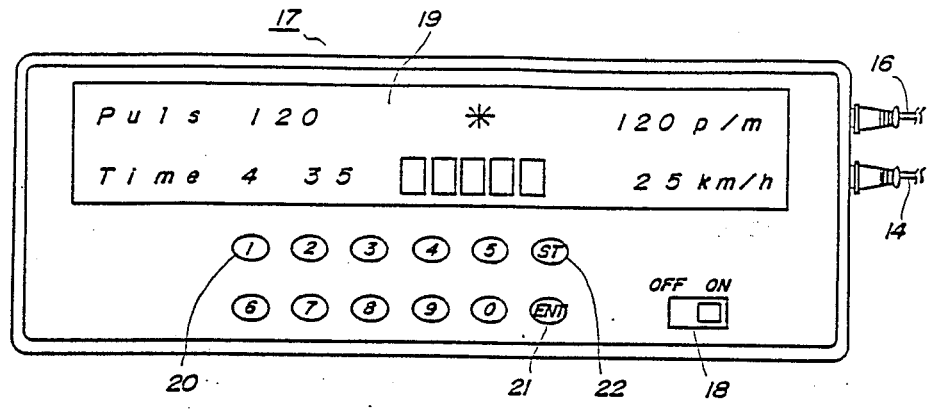

FIG. 3 shows a front view of the exercise management machine (17), in which (18) is the power ON-OFF switch, (19) the LCD which comprises the display portion, (20) the number keys, (21) the enter (ENT) key used to enter data input with the number keys (20) and (22) the start (ST) key. (14) and (16) are electric wire as explained above.

Figure 5:
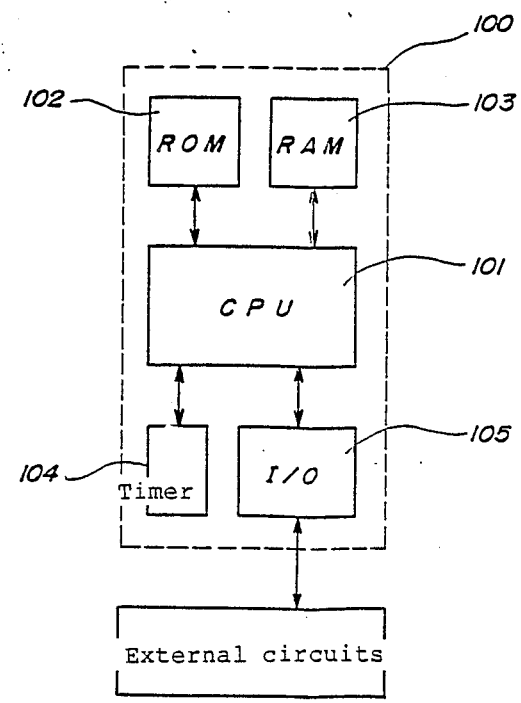
Figure 4:
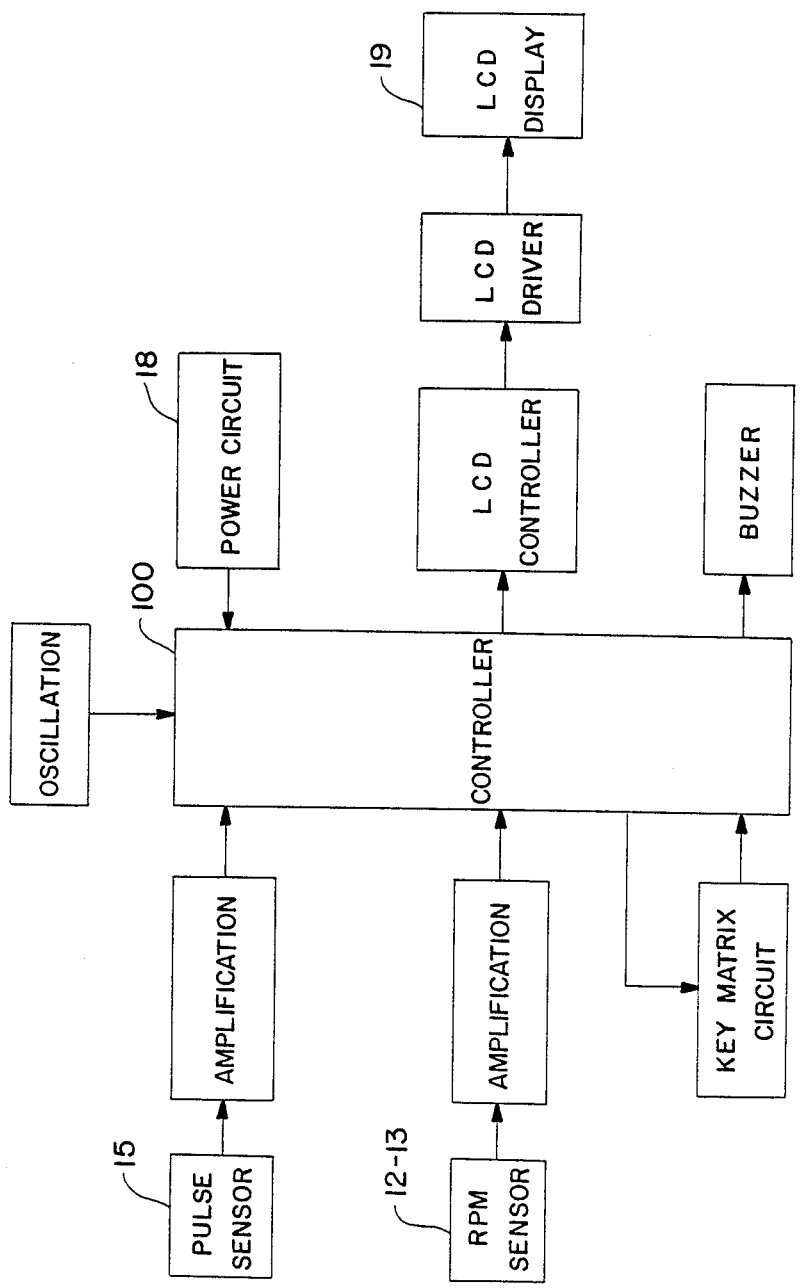

FIG. 4 is a block diagram which shows an embodiment of the control device used for this exercise management machine. 100 is the controller which comprises a microcomputer. The controller (100) calculates pulse by counting the input signal which is a pulse signal that is amplified and the waveform regenerated by the amplification and waveform regeneration circuit. The pulse signal is synchronized with the pulse that is obtained by the pulse sensor (15). The controller also calculates rpm by counting the input signal which is the hall starting power that is amplified and the waveform regenerated. The hall starting power is obtained from the rotation sensor which comprises the hall element (12) and magnet (13). The rpm is converted into speed and used to calculate distance traveled. In addition, the controller controls and processes input/output signals in the key matrix circuit that is generated by pressing the number keys (20), ENT key (21) and ST key (22). The controller (100) operates the LCD controller and LCD driver to display data on the LCD (19) according to the results of processing, and outputs a signal to operate the warning beeper and cause the beeper to emit a beep when the number keys (20), ENT key (21) and ST key (22) are pressed. The basic configuration of the controller (100) and its relation with other circuits is shown in FIG. 5.

101 is the CPU, 102 the program and fixed data memory ROM, 103 the temporary memory RAM, 104 the timer, and 105 the I/O section (input/output section).

Figure 6:
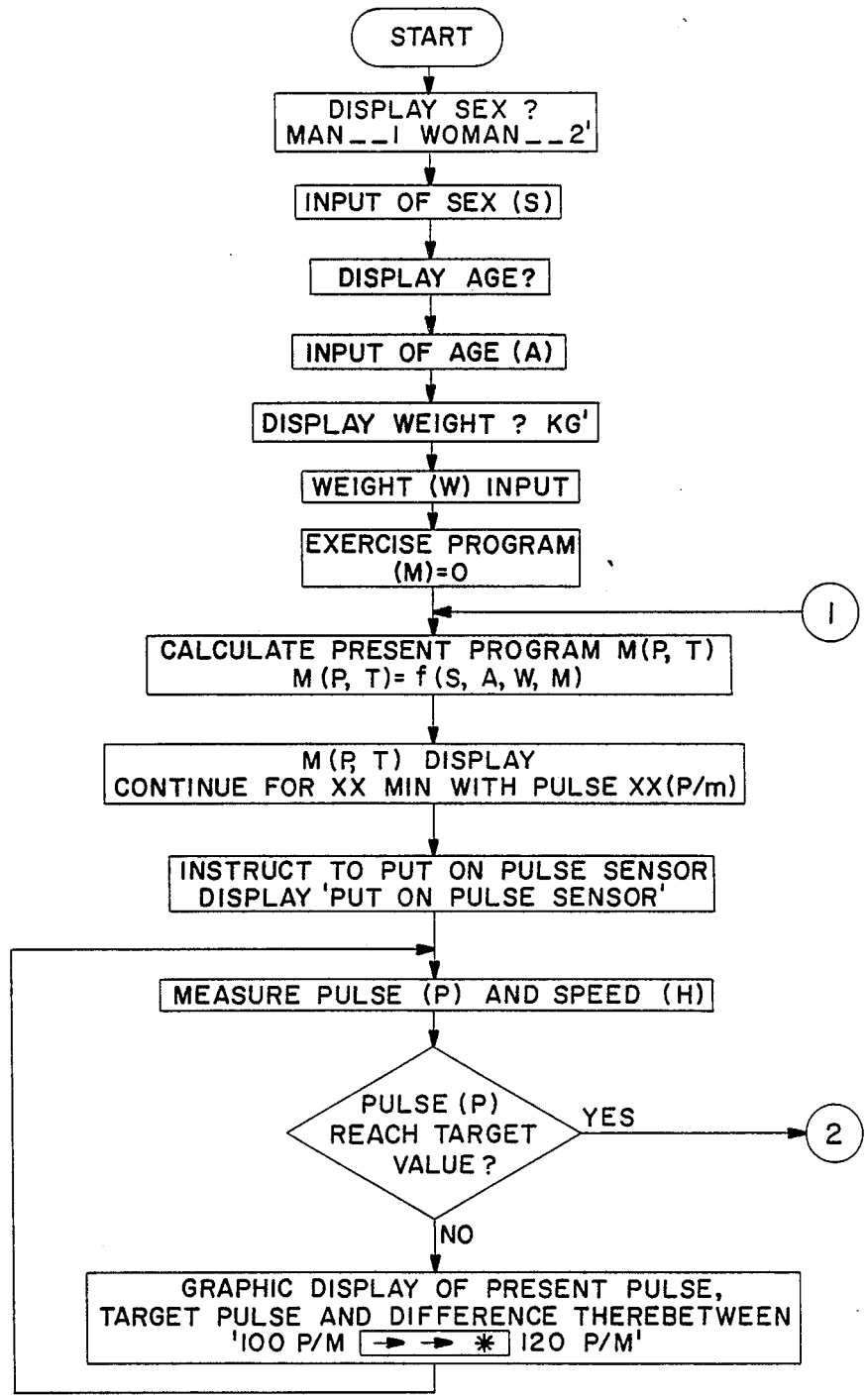
Figure 6B:
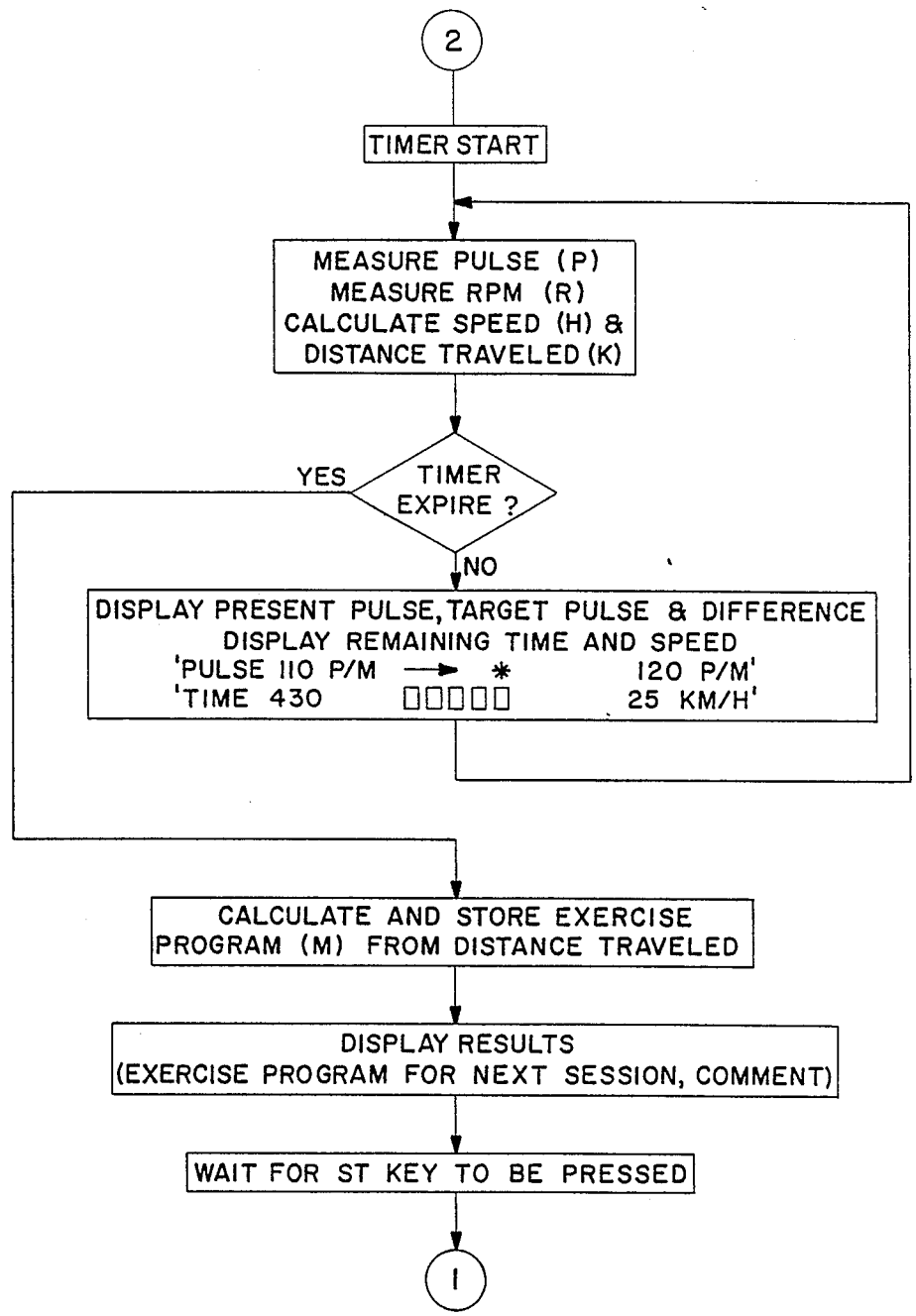

An embodiment of the functioning of this exercise management machine will now be explained using FIG. 6 (a) and (b) flow charts. The power ON-OFF switch is first turned on. [Sex? Man . . . 1 Woman . . . 2] appears on the display (19). The user uses the number keys to input his or her sex. The ENT key (21) is used to enter this data. Next, [Age?] appears on the display. The ENT key (21) is used again to enter the user's age. [Weight? kg] then appears on the display at which time the user enters his or her weight and presses the ENT key still again. At this point, the exercise program is set to 0, the initial setting. The exercise program is calculated at the next usage of the machine according to the user's age, sex, weight, previous program (if any) and the previous results. The exercise program is obtained from the table on the left, but if, for example, the results during the previous session were poor, program No. 1 is selected for this session.

| Age | Exercise Prog. No. | Target Pulse | Exercise Time | Exercise Standard Men | Exercise Standard Women |
|---|---|---|---|---|---|
|  | 1 | 120 | 5 | M1 | W1 |
|  | 2 | 130 | 5 | M2 | W2 |
|  | 3 | 140 | 5 | M3 | W3 |
|  | 4 | 145 | 5 | M4 | W4 |
|  | 5 | 150 | 5 | M5 | W5 |
|  | 6 | 155 | 5 | M6 | W6 |
|  | 7 | 155 | 6 | M7 | W7 |
| −29 | 8 | 155 | 7 | M8 | W8 |
|  | 9 | 155 | 8 | M9 | W9 |
|  | 10 | 155 | 9 | M10 | W10 |
|  | 11 | 155 | 10 | M11 | W11 |
|  | 12 | 155 | 11 | M12 | W12 |
|  | 13 | 155 | 12 | M13 | W13 |
|  | 14 | 155 | 13 | M14 | W14 |
|  | 15 | 155 | 14 | M15 | W15 |
|  | 16 | 155 | 15 | M16 | W16 |
|  | 17 | 115 | 5 | M17 | W17 |
|  | 18 | 125 | 5 | M18 | W18 |
|  | 19 | 135 | 5 | M19 | W19 |
|  | 20 | 140 | 5 | M20 | W20 |
|  | 21 | 145 | 5 | M21 | W21 |
|  | 22 | 150 | 5 | M22 | W22 |
|  | 23 | 150 | 6 | M23 | W23 |
|  | 24 | 150 | 7 | M24 | W24 |
|  | 25 | 150 | 8 | M25 | W25 |
|  | 26 | 150 | 9 | M26 | W26 |
|  | 27 | 150 | 10 | M27 | W27 |
|  | 28 | 150 | 11 | M28 | W28 |
|  | 29 | 150 | 12 | M29 | W29 |
|  | 30 | 150 | 13 | M30 | W30 |
|  | 31 | 150 | 14 | M31 | W31 |
|  | 32 | 150 | 15 | M32 | W32 |

The "exercise standard" in the table is the standard work volume when a person continues exercising for a specific time at a certain target pulse. The program for the next session is determined according to the amount of exercise done by the use in the present session. In this example, the brake (10) load is kept constant, with the user pedaling a set distance to do the set exercise amount. M1 and up and W1 and up are values for specific standard amounts of exercise. [Continue exercising at xxx pulses/min. for xx mins.] appears on the display according to the exercise program that has been calculated as explained above. [Put on pulse sensor] comes on the display next instructing the user to put on the pulse sensor (15). The user then starts pedaling the bicycle (1) with the pedals (6), increasing speed until he or she arrives at the target pulse. The pulse and bicycle rpm are monitored by the controller. (rpm is converted into speed.) The difference between the user's pulse and the target pulse, is displayed graphically as shown in FIG. 6 (a). When the user's pulse reaches the target level, the timer (104) is started, and the user's present pulse, target pulse, remaining exercise time, speed, etc., are displayed as shown in FIG. 6 (b). The timer stops when it reaches the specified time, the display is cleared and the distance traveled is computed from the number of revolutions. These results are recorded and used to determine the user's exercise program for the next session. The distance traveled and exercise program for the next session is then displayed along with comments on the person's health (bad, good, normal, etc.) Taking the age group under 29 as an example, there are exercise programs No. 1 to 16. As No. 16 is the highest level, the person continues at this level once he reaches it. The microcomputer monitors the user's physical condition and gives him/her an ongoing report [Example: You're doing great, or Have you been feeling bad?, etc.] When the ST key is pressed again, the machine returns to the condition shown in FIG. 6 (a)-(l), ready to repeat the above process.

The next time the power is turned ON to use the machine, the user's exercise program is displayed immediately when the ST key (22) is pressed. A number of people can use this exercise management machine if the individual's name and/or code is input, with the above results and exercise program for the particular individual being immediately displayed again when the ST key is pressed after entering name and code.

Figure 2:
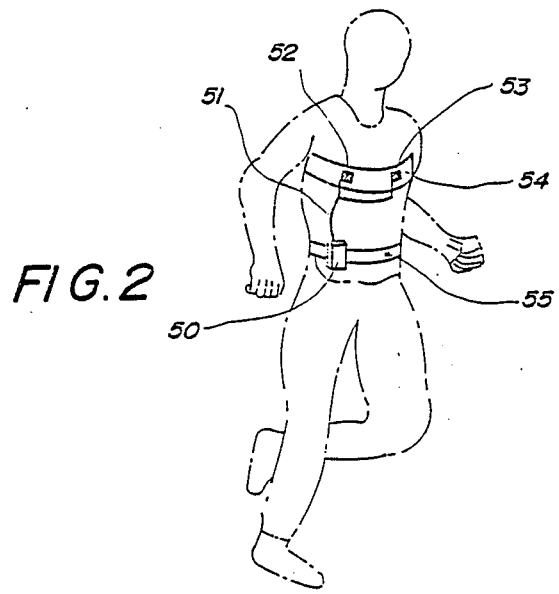

The objective of this invention, namely, providing an exercise program that is suited to the individual user's physical fitness, is not limited to the above embodiment. The same principles can be applied, for example, to the exercise management machine for jogging as shown in FIG. 2. An outline of the jogging management machine will now be explained. With jogging machines of the past, a band (54) was used to hold the electrodes (52), (53) directly against the user's chest, the pulse signal obtained was sent through wire (51) to the jogging management machine body (50) which calculated the user's pulse, that value would be compared with the target pulse, and beep(s) would sound to notify the user whether his or her pulse was higher or lower than the target pulse, or at the target pulse. This would permit the user to change his/her jogging speed to bring his/her pulse to the target value. A pedometer is incorporated into the body (50) which enabled the machine to calculate the distance jogged by presetting the user's stride.

By applying the basic principles in this invention, a suitable exercise program can be established for the individual (a different exercise program than for the training bicycle), and respective data can be calculated and displayed as explained for the bicycle. Comments on the individual's physical fitness such as [Congratulations, You're physical fitness rating has improved xx points over the last month], [You're doing great], [Are you feeling a little bit under the weather? Take better care of yourself], etc. appear on the display. 55 is the belt which holds the exercise management machine body (50).

An electronic beep or other sound, or an electronically synthesized voice may be used in addition to the display as means to inform the user of results, etc.

Figure 7A:
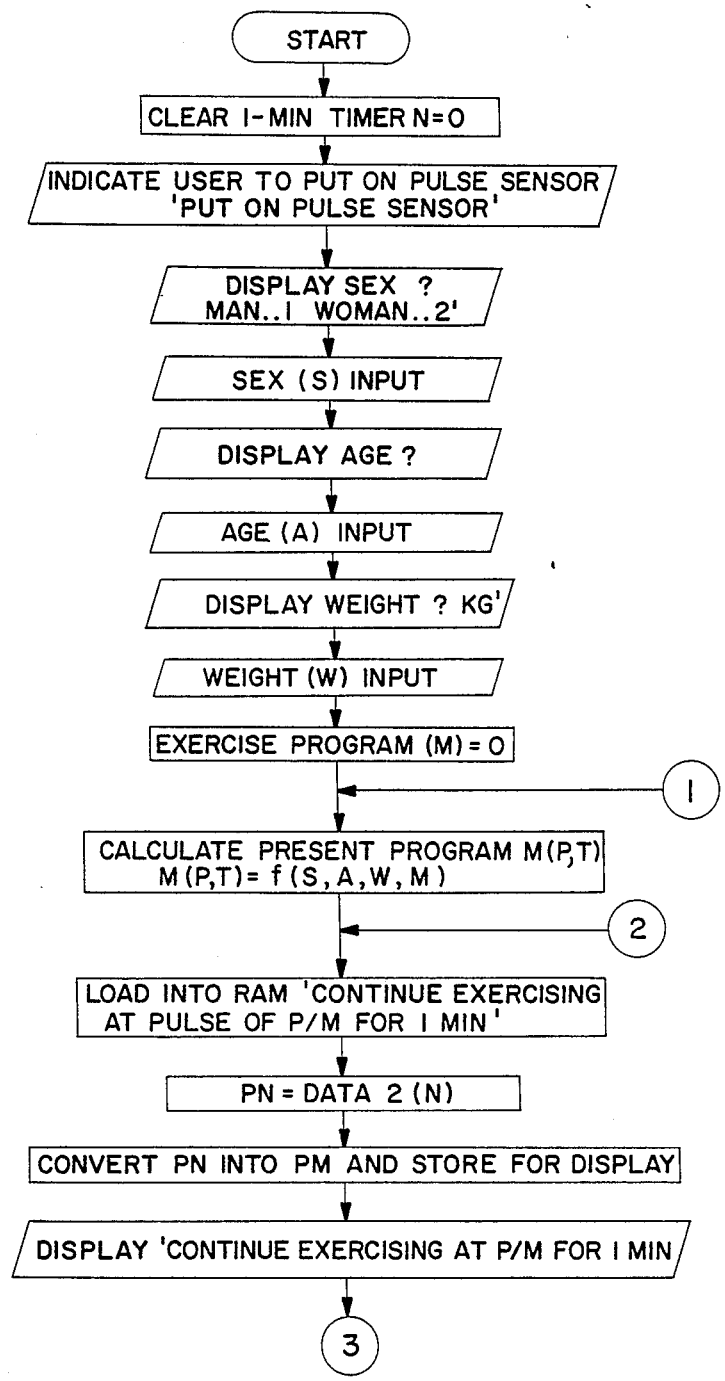
FIG. 7 (a), (b), (c), (d) and (e) are flow charts showing functioning of this exercise managment machine with other embodiments of this invention, FIG. 8 a flow chart showing an example of the graphic display, and FIG. 9 an example of the graphic display possible with this invention.
Figure 7B:
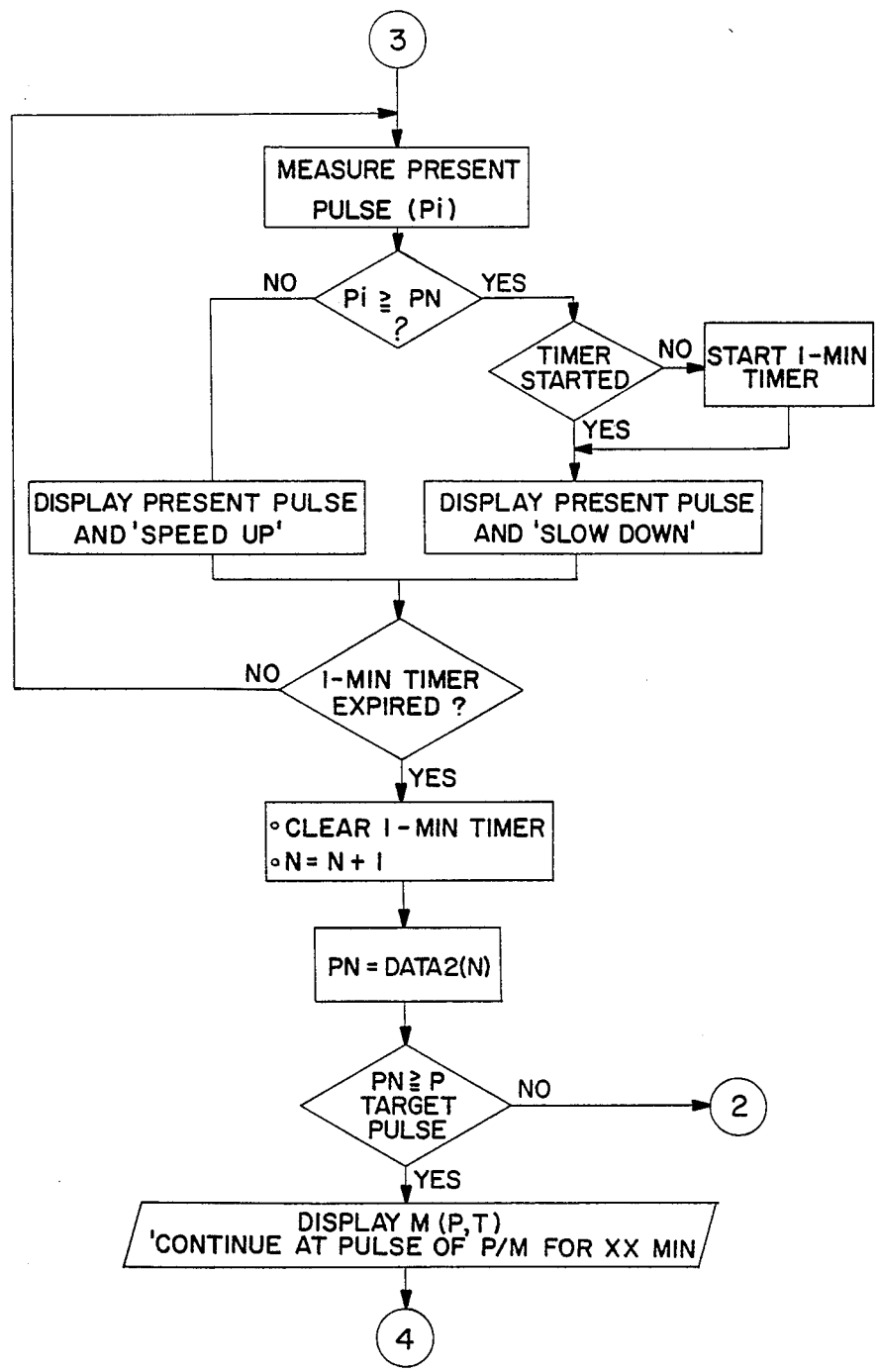
Figure 7C:
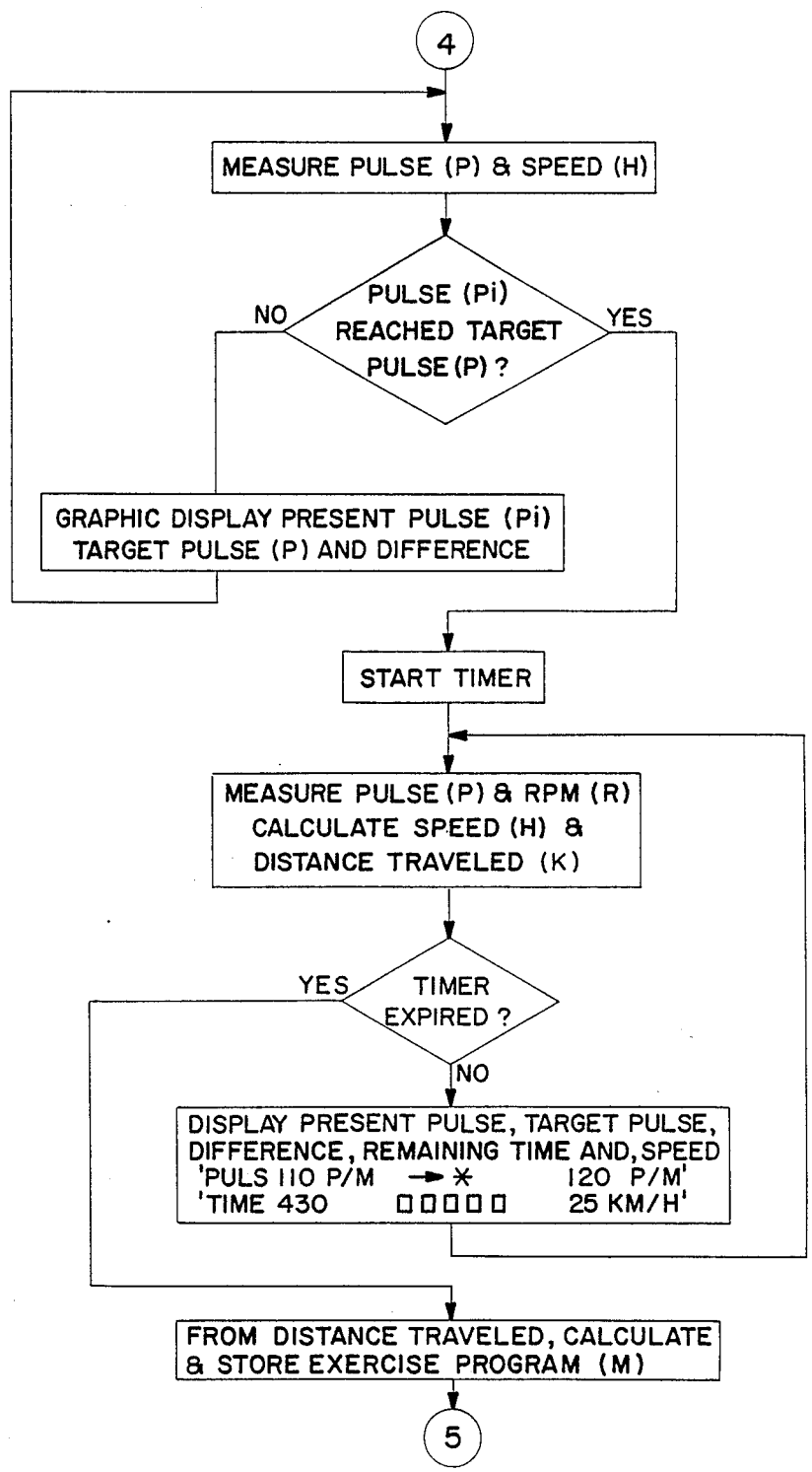
Figure 7:
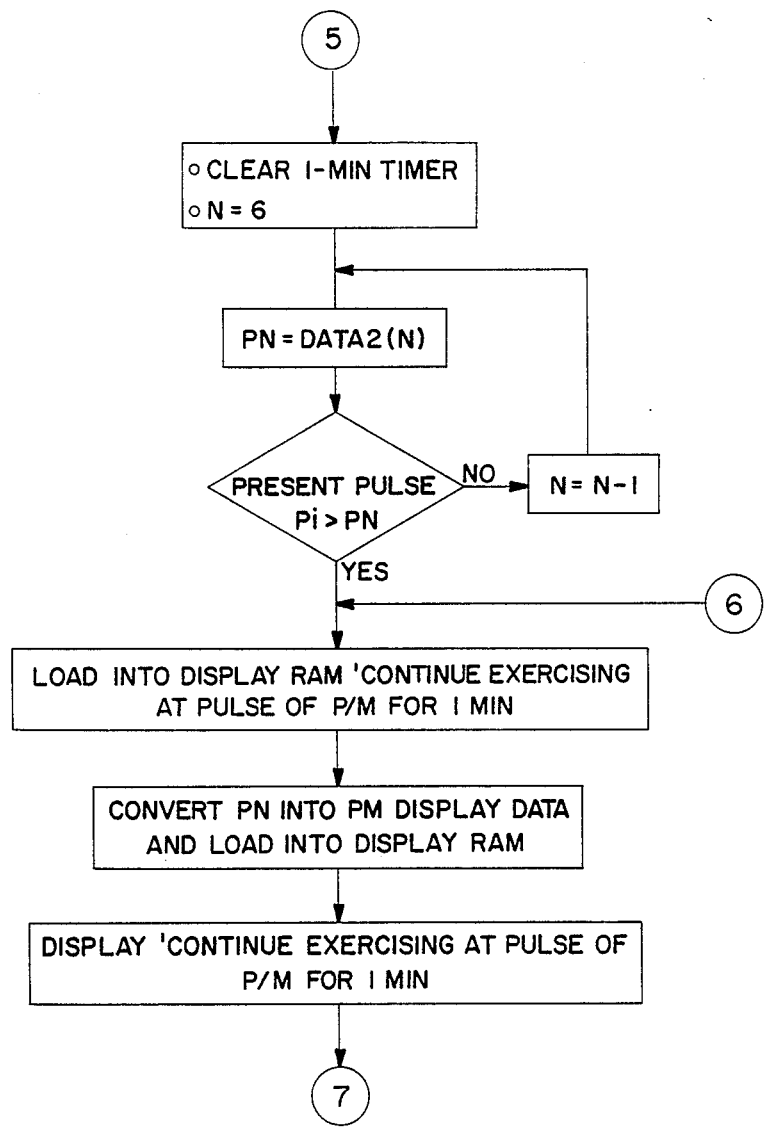
Figure 7E:
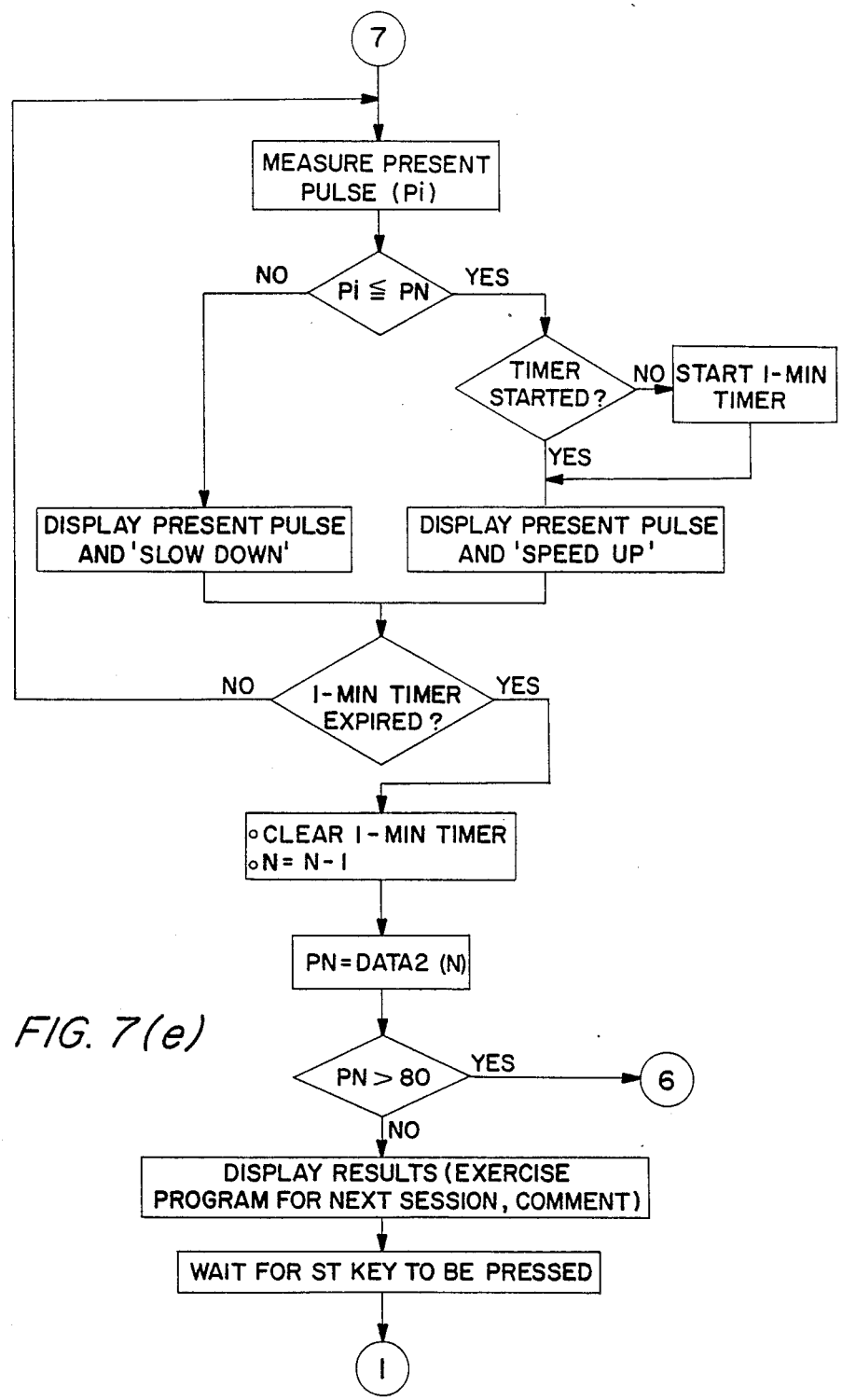

The flow charts in FIG. 7 (a), (b), (c), (d) and (e) will now be used to explain the functioning of this exercise management machine in other embodiments.

When the power ON-OFF switch is turned on, the one minute timer is cleared and the variable N is given a value of 0. [Put on the pulse sensor] then appears on the display (19) for a suitable length of time instructing the user to put on the pulse sensor (15). [Sex? Man . . . 1, Woman . . . 2] then appears on the display (19) and the user enters his/her sex with the number keys (20) and presses ENT key (21) to enter his/her sex. [Age?] then appears on the display and the user enters his/her age with the number keys (20) and presses the ENT key (21). Next [Weight kg?] appears and the user likewise enters this information using the number keys (20) and ENT key (21). At this point, the exercise program is at the initial setting of 0. The first exercise program is determined by the user's sex, age and weight, and the results of each session and the previous program are used to determine subsequent exercise programs. The data in Table 1 shown above is used to calculate the user's exercise program. If there is no previous exercise program or data, program 1 is automatically selected. [Continue exercising at xx p/m for 1 minute] is loaded into the display portion of the RAM (103). The program and data (for example, the data (2) as shown in Table 2) in the fixed memory ROM (102) are used to determine the target pulse (PN) for warming up.

TABLE 2

| N | 0 | 1 | 2 | 3 | 4 | 5 | 6 |
|---|---|---|---|---|---|---|---|
| PN | 80 | 100 | 120 | 130 | 140 | 150 | 160 |

If for example the value of N is set to 3 by the program, the target pulse (PN) for warming up is 130.

This pulse (PN) is converted into display data (PM) and is substituted for the characters that are in the display portion of the RAM. [Continue at a pulse (PM) p/m for 1 minutes] then appears on the display (19).

The user then starts pedaling the training bicycle (1) with the pedals (6) to attain the target pulse that appears on the display, the pulse sensor (15) sends the user's pulse (Pi) to the controller (100), the controller compares the user's pulse (Pi) with the target pulse (PN) and starts the one minute timer (106) if $Pi \geq PN$ as shown in FIG. 7 (b). Simultaneously, [Slow down] appears on the display (19) if the user's pulse exceeds the target value (Pi>PN), and [Speed up] appears on the display if the user's pulse is less than the target value (Pi<PN). This is repeated until the one minute timer expires, to maintain the user's pulse at as close a value to PN as possible. When the one minute timer (106) expires, the one minute timer (106) is cleared, the variable N is set to N=N+1 and the target pulse (PN) is set according to the Data (2) in Table 2, PN is compared to the target pulse (P) for full scale training, and if it is a lower value, it repeats the operation shown from FIG. 6 (a)-(2) a minute at a time to increase the user's pulse (Pi) to prepare the user for full fledged training. When the user's pulse exceeds the target value ($PN \geq$), the full fledged training target pulse (P) and exercise time appear on the display (19) [Continue for xx min at a Pulse of xxx p/m].

When the user commences full fledged training, his/her pulse (Pi) is measured, the speed (H) measured from the revolutions of the wheel (9), the user's pulse (Pi) is compared with the target pulse (P) as shown in FIG. 7 (c), and if Pi<P, the user's pulse (Pi) at that time, the target pulse (P) and the difference between the two are graphically displayed as explained later. If $Pi \geq P$, the timer (104) is started, the user's pulse (Pi) and the revolutions (R) are measured, and the speed (H) and distance traveled (K) are calculated. The user's pulse (Pi) at any given time, the target pulse (P), the difference between the two, time remaining, speed (H), etc. are displayed as shown in FIG. 7 (c). When the prescribed time passes, the timer (104) expires and is cleared, at which time the distanced traveled is calculated from the number of revolutions (R).

These results are used to calculate the exercise program for the next session and are then memorized. The one minute timer (106) is then cleared according to the program in the ROM (102), N is assigned a value of 6, and the target pulse (PN) is determined according to the data (2) in Table 2as shown in FIG. 7 (d). If pulse PN is larger than the user's pulse (Pi) the variable N is set to a value of N=N−1, until the user's pulse is higher than the pulse PN (Pi>PN) then appears on the display (19). This process is repeated one minute at a time to bring the user's pulse (Pi) down until PN>80. The results of training that were calculated as explained above, the exercise program for the next session and comments (on the user's physical condition—normal, good, bad, etc.) appear on the display (19).

Taking the age group of up to 29 years, there are only program Nos. 1 to 16. People that have reached level 16 continue exercising at that level. Data on the user during each session is compared with previous data and comments are displayed [e.g. You're doing great, Have you been feeling a little under the weather?]. When the ST key (22) is pressed the next time, the machine returns to the condition shown in FIG. 7 (a)-(l), a the above process is repeated.

Furthermore, the next time the machine is used, the exercise program is displayed as soon as the power swith is turned ON. A number of people can use this exercise management machine by entering the individual's name or code etc. with the above exercise results and exercise program. In this case, the individual's exercise program can be displayed the next time he/she uses the machine by first entering their name or code and then pressing the ST key (22).

As explained in the above embodiment, this invention provides for rational training from the initial warm-up to cooling down (to bring the individual's pulse down at a regulated rate), and prevents the possibility of dangerous over-exercising by providing means to constantly inform the user of his present condition and appropriately instructing him in accordance with his/her exercise program.

Figure 8:
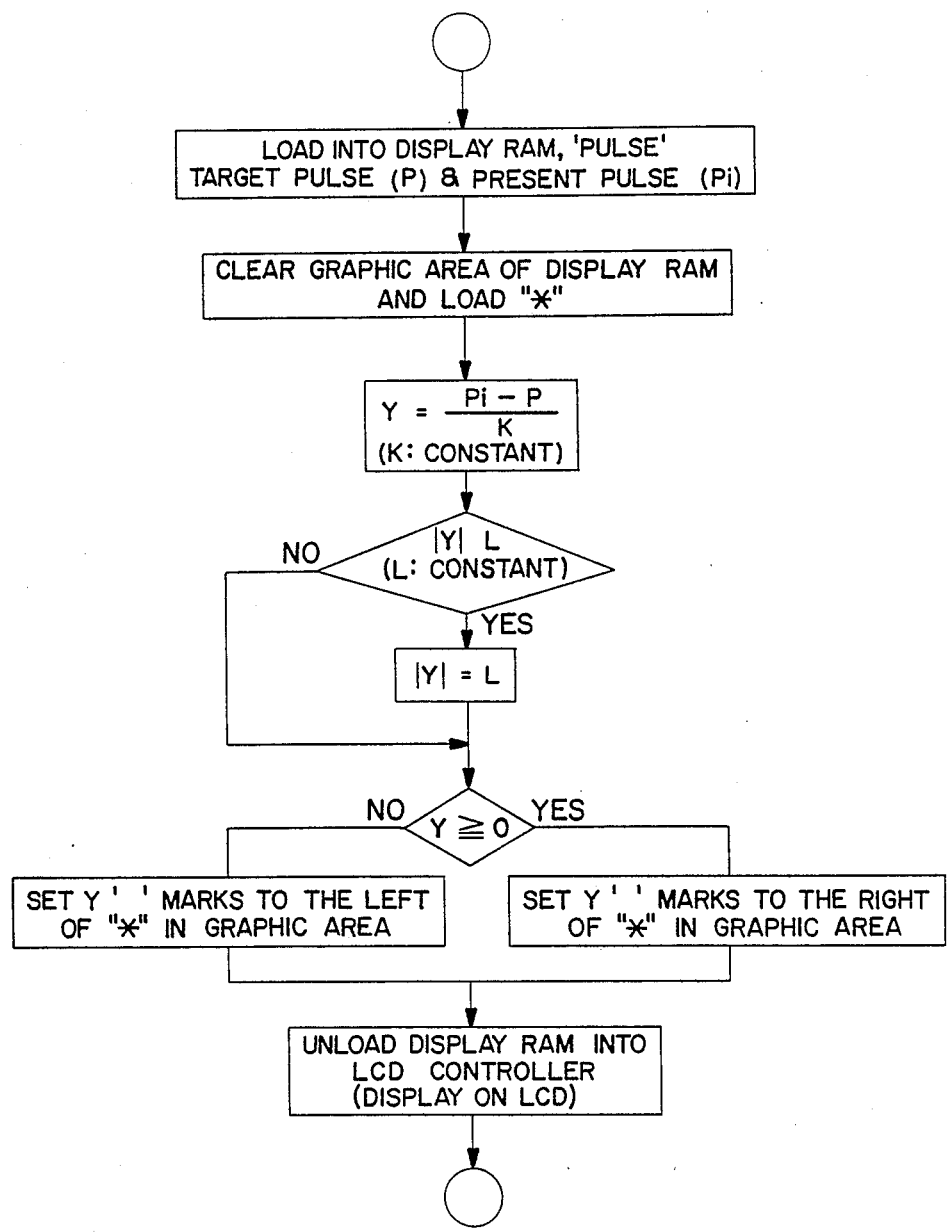

The flow chart in FIG. 8 will now be used to explain the graphic display that appears on the display (19).

"Pulse", "p/m", target pulse (P) and the present pulse (Pi) are loaded in the display portion of the temporary memory RAM (103). The graph area of the display portion of the RAM is cleared and "*" appears in the center of the graph area. The difference between the target pulse and the present pulse of the user (Pi) is divided by a constant K (for example 2) to obtain the length Y that should appear on the graph. A maximum value L (for example 10) is decided for the length of Y, and provision is made to prevent the absolute value of Y from exceeding L. The RAM is programmed so that when the value of Y is positive, Y left-handed arrows ("←") appear to the right of the "*", and when the value of Y is negative Y right-handed arrows ("→") appear to the left of the "*". The above data that is recorded in the RAM is output to the LCD controller to drive the LCD driver, and appears on the LCD display (19).

Figure 9:
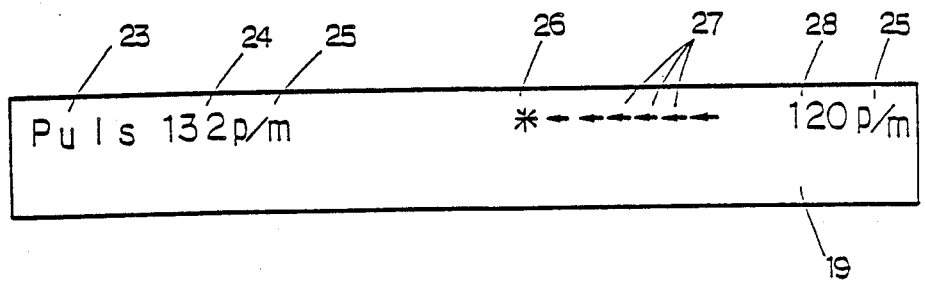

FIG. 9 shows an embodiment of the LCD display (19). 23 is the letters "Pulse", 24 the user's present pulse, 25 the letters "p/m", 26 ("*") indicates the position of the target pulse on the display, 27 is a left-handed arrow ("←") and 28 the target pulse. As is shown in FIG. 8, the graphic display of the difference between the user's pulse (Pi) and the target pulse (P) allows the user to easily determine the difference at a glance and in turn accurately control his/her exercise rate.

In the other embodiment(s) of this invention which will be explained in the following pages, the work factor of the user can be accurately determined by simply entering the brake (application pressure) value in a machine that can be manufactured at a relatively low price.

With this device, the value of the brake setting is read and entered while the user trains at a target pulse for a prescribed time. The work factor (W) is calculated from the brake value (KP), pedal revolutions (rpm) and distance traveled per revolution. The individual's score is calculated and displayed, with a maximum work factor (WH) of 100.

A rank is determined from the work factor (W), age and sex, and is displayed. The individual trains 5 times a week, and is instructed to move to the next higher exercise program when he/she has accomplished the same program the specified number of times (5–10). The individual may be instructed to advance to the next higher level automatically.

The exercise machine thus obtains the results of the individual's exercise, informs the individual of his/her progress and instructs him/her to advance to the next higher level.

Figure 10:
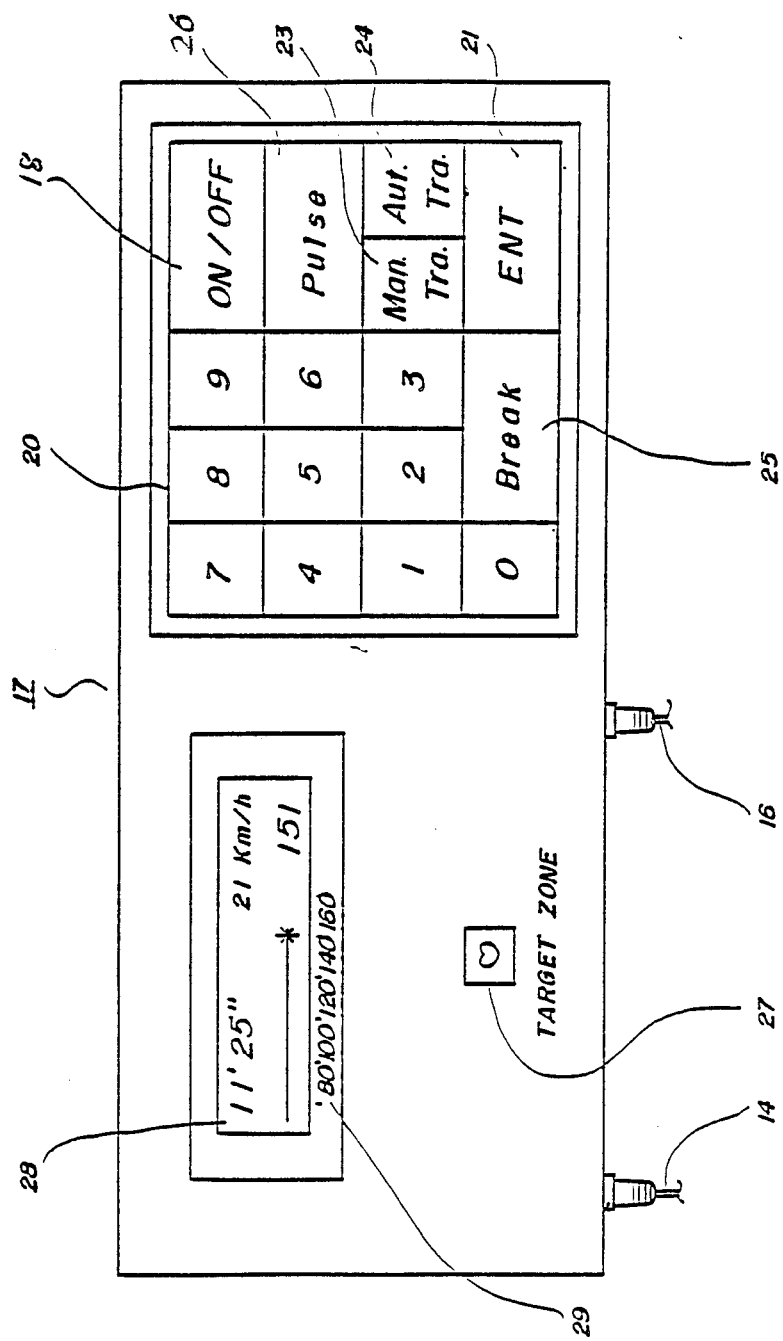
FIG. 10 is a top view of an outline of another embodiment of this exercise management machine.
Figure 12A:
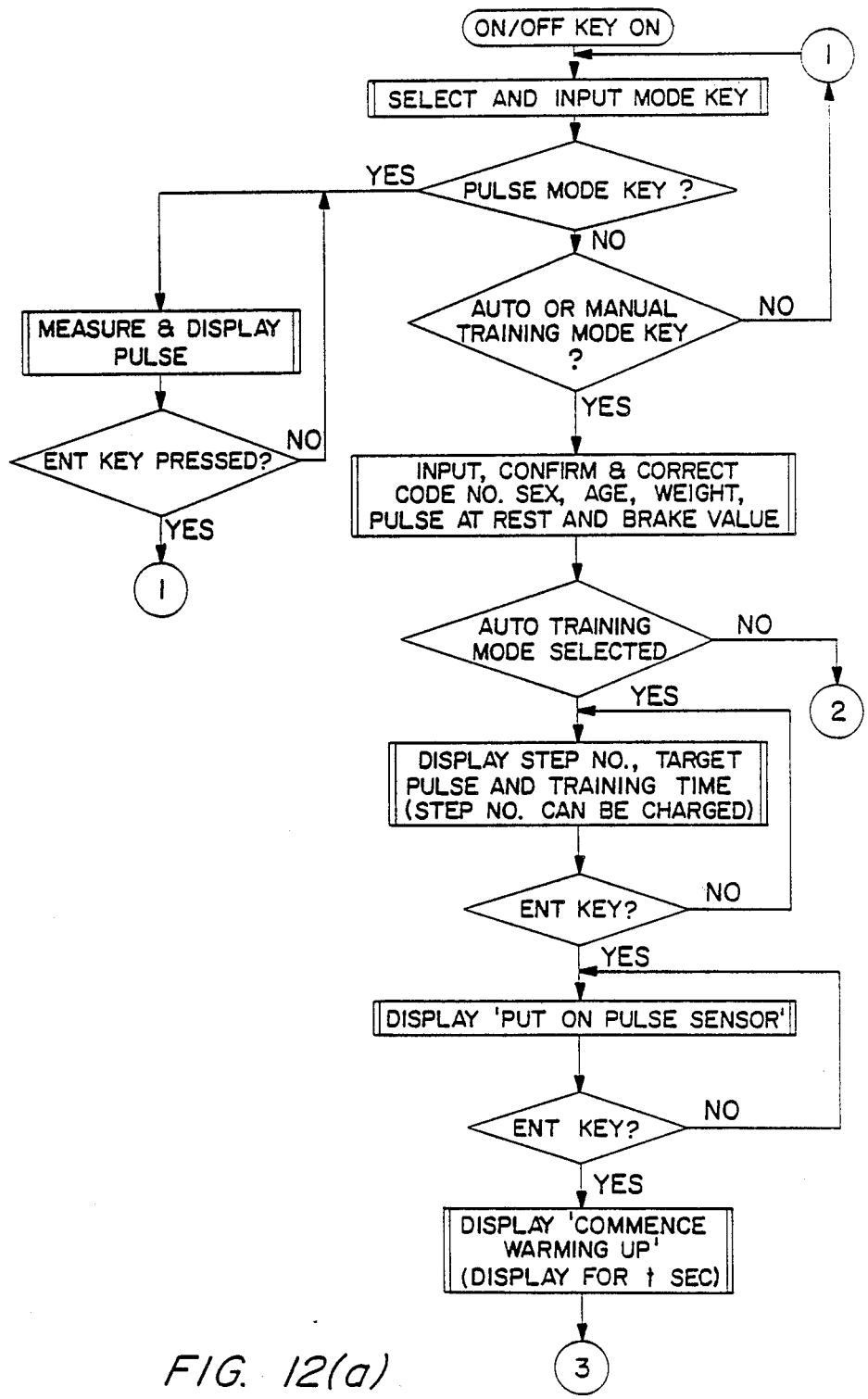
Figure 12B:
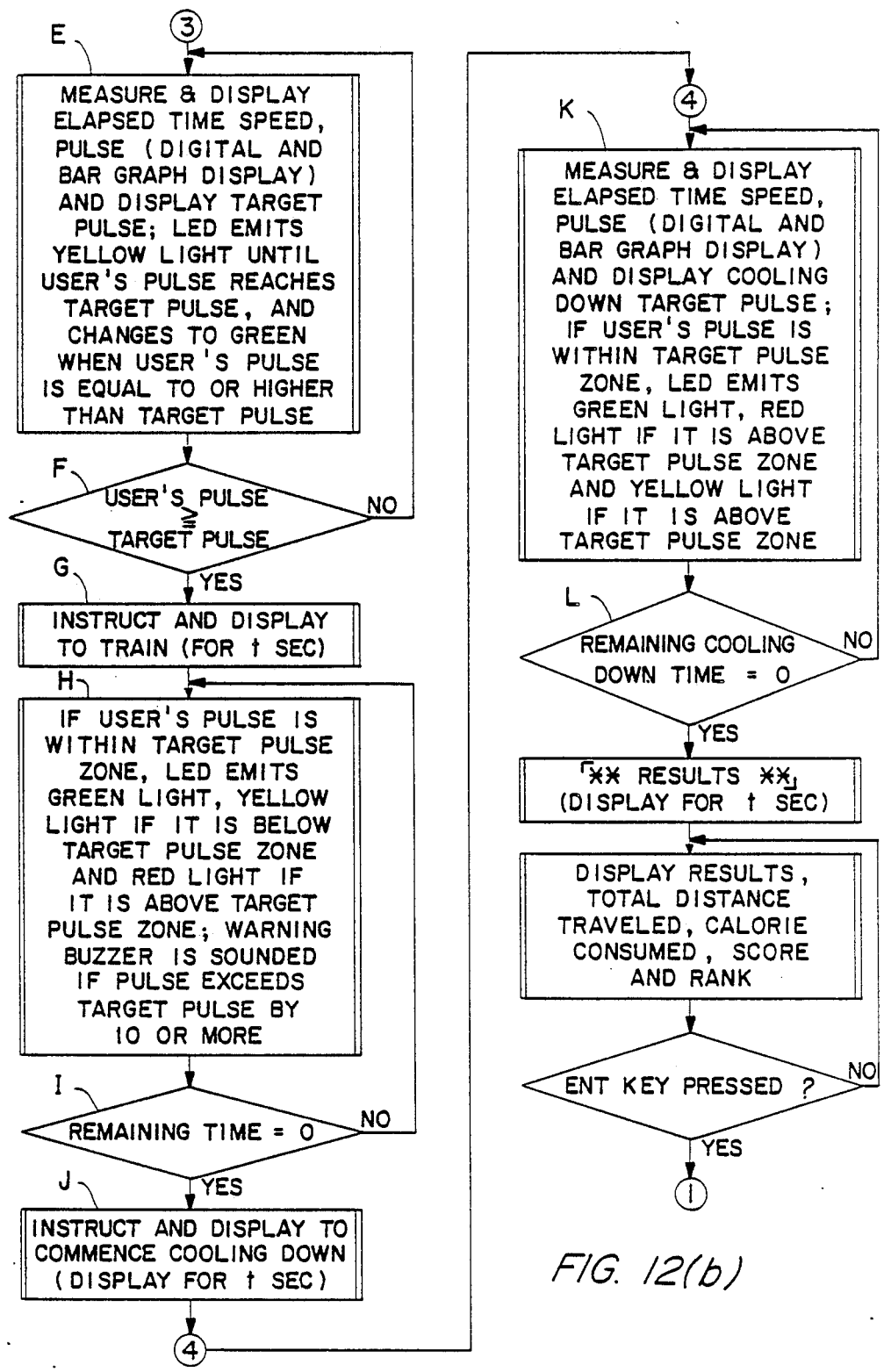
Figure 12C:
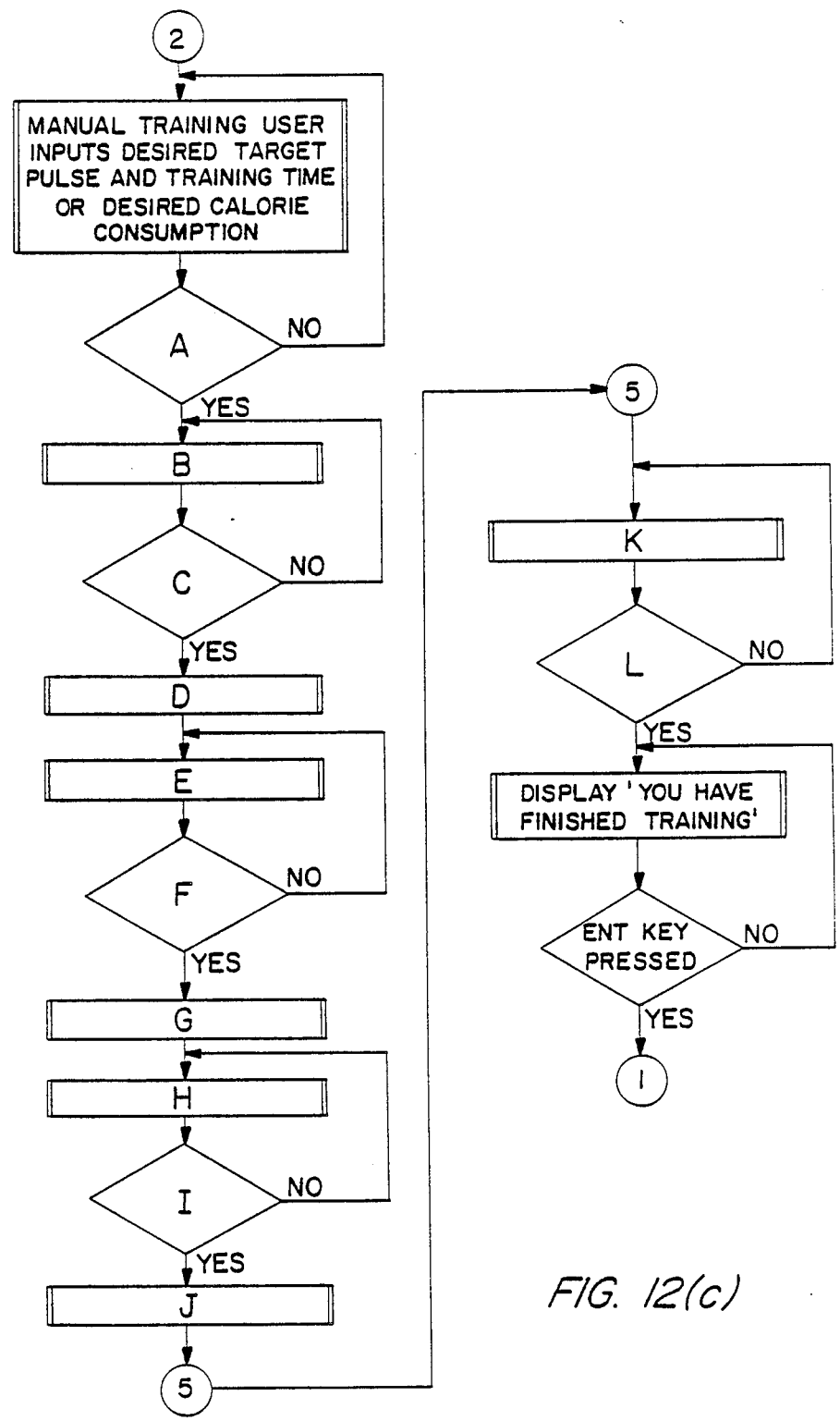

FIG. 10 illustrates another embodiment of this invention, with an outline of the exercise management body (17). 18 is the power ON/OFF key, 20 the number keys, 21 the ENT key used to enter data as shown by the flow charts in FIG. 12 (a) to (c), 26 the pulse mode key used to select the pulse mode, 23 the manual training mode key (with which the user can set his/her target pulse and training time, and/or the number of calories he/she wishes to consume). 24 is the auto training mode key (which is used to manage, calculate and automatically output a training menu and judge results as is explained below), 25 the break key which can be used to end the training session at any time and display the results. 27 is an LED which can emit green, red or yellow light, to inform the user whether he is above, below or within the target pulse zone (e.g. target pulse ±5). The user's pulse is measured and compared with the target pulse as shown in the flow charts in FIG. 12 (a) and (c). The LED (27) flashes when it is synchronized with the user's pulse.

28 is the LCD dot matrix display and 29 the graduated plate used to read the user's pulse that appears on the bar graph portion of the LCD display.

Figure 11:
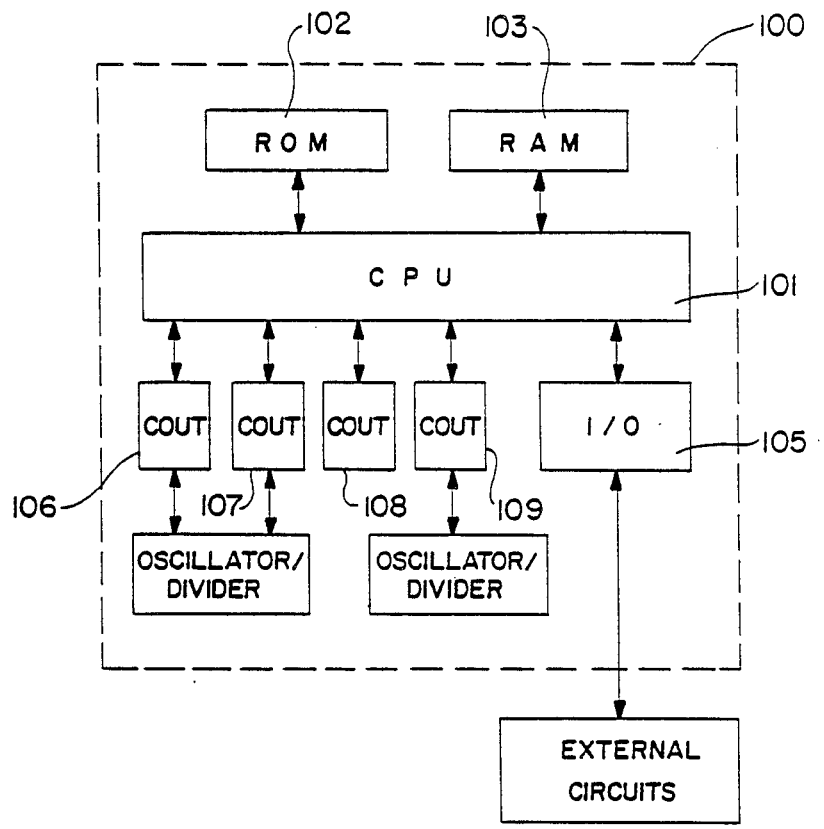
FIG. 11 is a block diagram showing the fundamental configuration of the controller and relation with outer circuits, FIGS. 12 (a) to (c) are flow charts showing the functioning of this exercise management machine, FIGS. 13 (a) to (g) illustrate how display will be effected with this invention.

The relation between the controller (100), which comprises the microcomputer, and the external circuits is shown in FIG. 11.

101 is the CPU, 102 the program and fixed data memory ROM, 103 the temporary memory RAM, 105 the I/O (input/output) section, 106 the counter which counts the interval between pulse signals using the standard frequency (the data from the counter (106) is used to calculate the user's pulse), 107 the counter that counts the interval between rotary signals using the standard frequency (the data from the counter (107) is used to calculate rotating speed and cruising speed), 108 the counter that counts the number of rotary signals (the data from counter (106) is used to calculate total number of revolutions, distance traveled, etc.), and 109 the counter that counts elapsed time using the standard frequency (the data from counter (109) is used to calculate time and in turn manage the various time spans).

The pulse signal is synchronized with the pulse obtained by the pulse sensor (15), and is then amplified and the waveform is rectified. The rotary signal is obtained by amplifying and rectifying the waveform of the output from the hall element or lead switch of the rotary sensors (12), (13).

The functioning of this exercise management machine will be explained using the flow charts in FIG. 12 (a), (b) and (c).

Figure 13A:
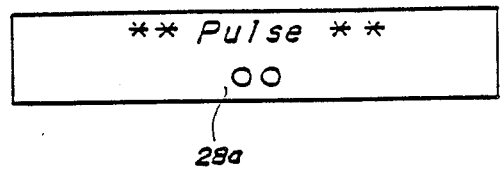
Figure 13B:
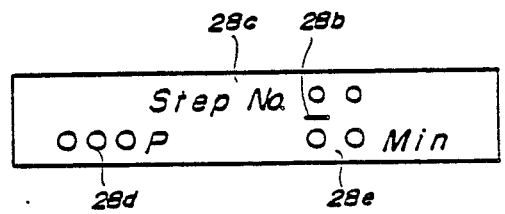
Figure 13C:
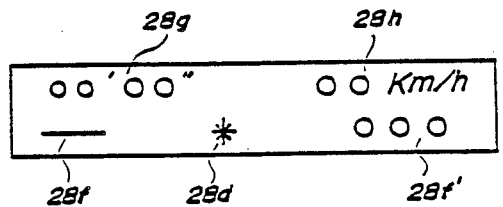
Figure 13D:
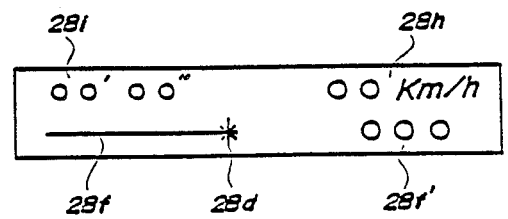
Figure 13:
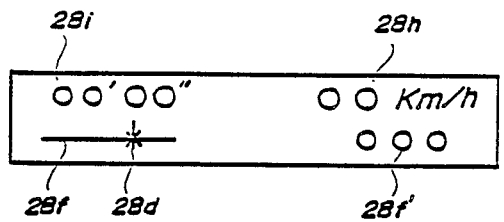
Figure 13:
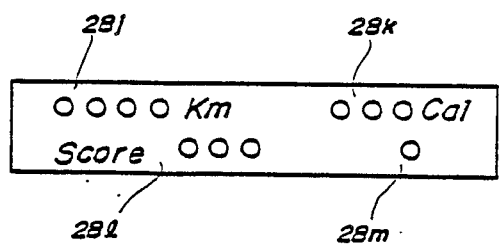
Figure 13:
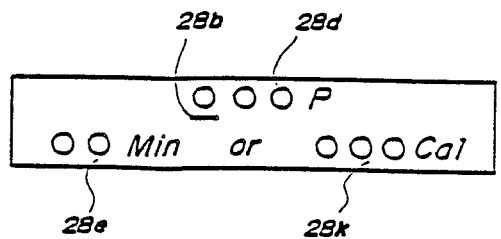

The ON/OFF key (18) is first turned ON at which time a phrase appears on the display instructing the user to press the desired mode key. If, for example, the pulse mode key (26) is pressed, pulse measuring mode appears on the display. When the user puts on the pulse sensor (15), the user's pulse appears on the display as shown in FIG. 13 (a). When the auto training mode key (24) or manual training mode key (23) is pressed, people using the machine for the first time are given a code No. and are instructed to enter their sex, age, weight, pulse at rest and brake value. People that have used the machine before can simply enter their code No., and press the ENT key (31), and the previous data that has been memorized is immediately displayed. The user then checks the data and makes any corrections if necessary. Corrections are made by entering the desired number(s) above the cursor (28b). When a new number is entered, the cursor (28b) moves to the next position where a correction can be effected and waits. (Corrections are made in this way when making changes in step No. (28c), and setting of target pulse (28d) in the manual training mode, training time (28e) and calories consumption, etc.)

After checking the display and making any corrections, when in the auto training mode (the manual training mode will be explained later) the target pulse (28d) (e.g. calculated from formula 1 and 2) and the training time (28e) are calculated from the personal data, i.e. code No., the present step No., No. of usages of the machine, sex, age, pulse at rest, and are displayed as shown in FIG. 13 (b). If the user is not feeling that well or wants to exercise a little harder than usual, he/she can change the step No. with the cursor (28b) explained above. If the step No. is changed, the new target pulse (28d) and training time (28e) are immediately calculated and displayed.

Formula 1 Calculation of target pulse (example)

Target pulse = (220 − age − pulse at rest) ×

$$\frac{\text{Exercise rating} + \text{pulse at rest}}{100}$$

Step No.
Exercise rating

Formula 2 Exercise rating

Exercise rating =

-continued

Pulse while exerciseing − pulse at rest $$\frac{\text{Max. pulse} - \text{pulse at rest}} \times 100 \ (\%)$$

Max. pulse = 220 − age

Formula 3 Example of step No., training menu and No. of usages of machine (Male, Age: 30, Pulse at rest: 70)
Step No. Training Menu No. of Usages
target Pulse Time
(p/m) (min.)

When the user presses the ENT key (21), he is instructed to put on the pulse sensor, and when he/she presses the ENT key (21) again after putting on the pulse sensor (15), he/she starts pedaling when "Warm up" appears on the display for t seconds (e.g. 3 seconds). The user selects a brake value (and enters this value), and pedals the bicycle at an appropriate speed to arrive at the prescribed target pulse (28d).

While the user is pedaling, his/her pulse (bar graph and digital display) (28f, 28f'), elapsed time (28g) and speed (28h) are measured and displayed along with the target pulse (28d) (level display) as shown in FIG. 13 (c). The LED (27) emits yellow light until the user's pulse (28f) reaches the target pulse (28d), and starts emitting red light when the user's pulse (28f) is equal or more than the target pulse (28d).

When the user's pulse is equal or higher than the target pulse (28f>28d), the user is informed that he has started training for t seconds on the display.

The user's pulse (28f, 28f'), remaining time (28i) and speed (28h) are measured and displayed along with the target pulse (28d) as shown in FIG. 13 (d). If the user's pulse (28f, 28f') is within the target pulse (28d) zone, the LED (27) emits green light, yellow light if it is below the target pulse zone, and red if it is above the target pulse zone.

A buzzer sounds if the user's pulse (28f, 28f') exceeds the target pulse (28d) by 10.

When the remaining time (28i) counts down to zero, the user is informed on the display that the training time has ended and is instructed to start pedaling slower to cool down.

The target pulse (28d) while the user is cooling down is immediately calculated from formula 4 below when the user starts cooling down, and is displayed as the target pulse (28d) as shown in FIG. 13 (e). The remaining time (28i), speed (28h), and the user's pulse (28f, 28f') are measured and displayed.

Formula 4 Calculation of target pulse while user is cooling down (example)
Same as formula 1, however the exercise rating is as follows:
Step No.
Exercise Rating

*In the manual training mode, exercise rating = 30

It is advisable to have the user cool down for several minutes, but he/she is informed of the results on the display [* Results *] for t seconds while he/she continues cooling down.

Figure 15:
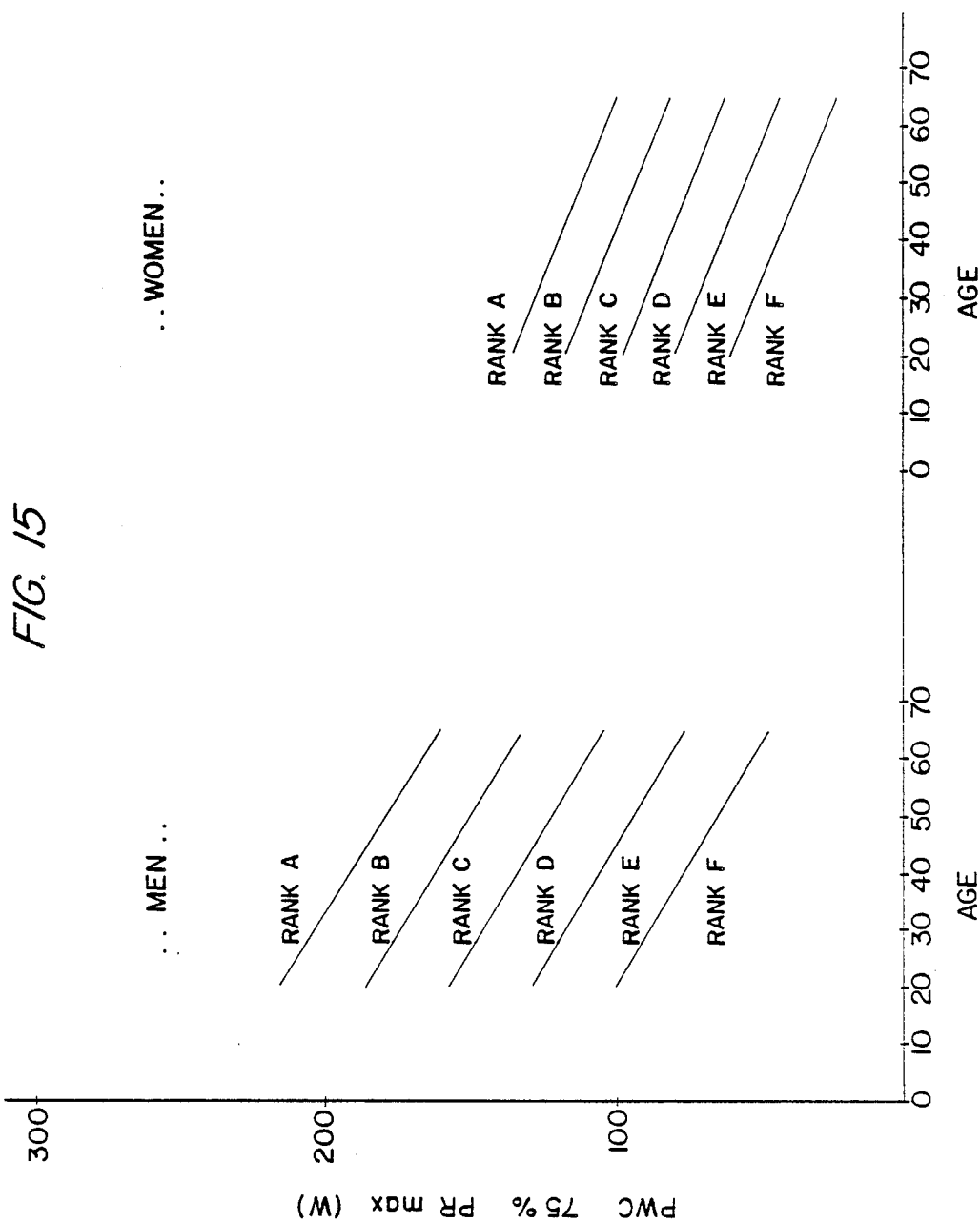

The total distance traveled to date (distance traveled in all previous sessions+distance traveled this session) (28j), calories consumed (calculated from formula 3 below) (28k), score [PWC75% PR max is calculated from formula 5 below, and the individual's score is calculated from that value and 300W (max. is assumed to be PWC75% PR max, which is a score of 100)] and rank (calculated as shown in FIG. 15) (28 m) are displayed.

Formula 3 Calories consumed (example)
Calories consumed =
Max. oxygen inhaled × exercise rating × weight × time × 4.86 × 10$^{-3}$
Max. oxygen inhaled =
Max. is assumed to be 82 ml/kg.min which changes according to the individual's physical condition.
(Here this is calculated according to the individual's score.) (For an individual with no prior score, this is assumed to be 44 ml/kg.min for men and 33 ml/kg.min for women.)

Figure 14:
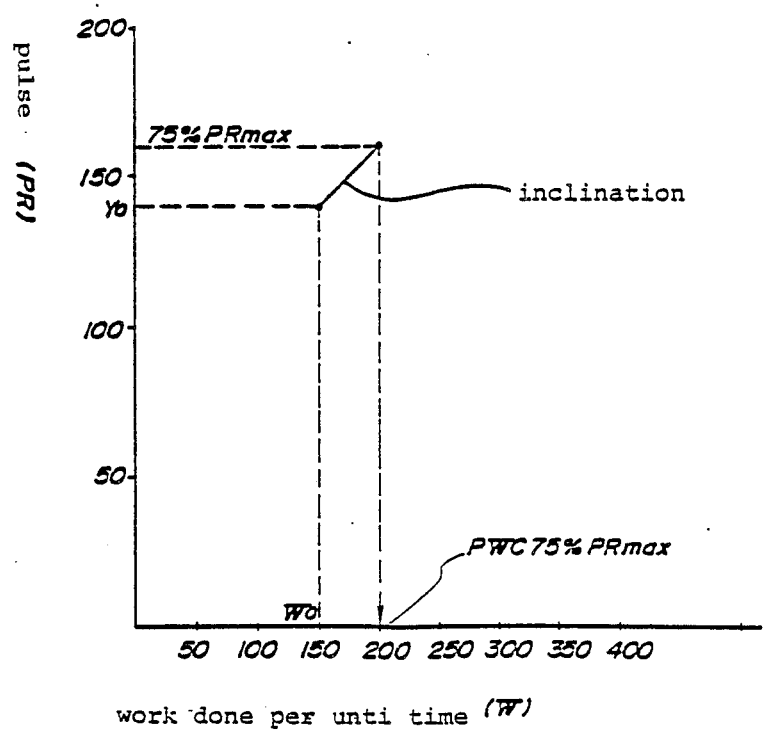
FIG. 14 shows the relation between pulse and work ratio and FIG. 15 shows the relation between work ratio and rank.

Formula 5 Calculation of PWC75% PR max (work factor at 75% of exercise rating) (example shown in FIG. 14).

$$PWC75\% \ PR \ \max = \frac{\gamma - \gamma_o}{a} + W_o$$

$$W_o = B_o \times R \times L \times \frac{1}{60} \times 9.2(W)$$

R = Average rpm
L = Distance traveled per revolution (e.g. 6 m)
Bo = Brake value while training (KP)
Yo = target pulse while training
Y = 75% PR max
a = inclination shown in FIG. 14 which is a constant (this will differ slightly depending on the individual, but does not need to be considered for practical purposes.)

The next step No. and the number of usages for the next time are calculated from the present step No. and present number of usages of the machine (see Table 3 above) and are memorized with the individual's code and rank (see Table 4 below).

TABLE 4

(the step No. is increased according to the individual's rank - example)

Rank
Step No.

When the ENT key (21) is pressed again, the machine returns to condition (1).

When the manual training mode key (23) is pressed to select the manual training mode, the machine goes to condition (2).

In this case, the user can change the target pulse (28d), training time (28e), calorie consumption (28k) to the desired values [the user enters the desired pulse, and training time or calorie consumption (the training time is calculated from formula 3 when desired calorie consumption is entered)] to select the desired training menu.

The user proceeds through warming up, training and cooling down as was explained for the auto training mode, and when the remaining time during cooling down reaches a value of 0 [You have finished] appears on the display.

The machine returns to condition (1) when the ENT key is pressed again.

The exercise management machine in this invention prescribes an exercise program that is suited to the individual, prevents the dangers of over or under exercising and gives significant advice on the physical condition of the individual.

What is claimed is:

1. An exercise management device comprising:
   pulse sensor means for detecting the pulse rate of a user of the device and producing a signal related thereto;
   motion sensor means for detecting the rate of motion of said user and producing a signal related thereto; and
   computer means for managing the rate and total amount of exercise performed by said user, including
   keyboard input means for inputting data to said computer means, said data being associated with particular vital statistics of said user,
   memory means for storing a plurality of exercise programs,
   means for selecting an appropriate exercise program stored in said memory means in response to data input by said keyboard means,
   means for determining the progress of said user during the performance of said program in response to the signals produced by said pulse sensor means and said motion sensor means,
   means for advising said user whether to increase or decrease the rate of motion thereof in response to the progress of the user in performing said exercise program;
   means for storing data associated with the progress of said user upon completion of a previous exercise program, and
   means for determining the appropriate subsequent exercise program for said user in accordance with said stored data.

2. An exercise management device as claimed in claim 1, wherein said means for advising comprises an alphanumeric display.

3. An exercise management device as claimed in claim 2, wherein said means for advising further comprises a buzzer.

4. The exercise management device of claim 2, wherein said display displays both a target pulse associated with said program and the instantaneous pulse of the user while performing said program.

5. The exercise management device of claim 2, wherein said display displays the amount of time elapsed during performance of said program, and the rate of motion of the user.

6. The exercise management device of claim 1, further including means for calculating the total volume of exercise completed by the user.

7. The exercise management device of claim 1, further including means for calculating the amount of calories consumed by the user during performance of the exercise program.

8. The exercise management device of claim 1, further including means for storing data associated with a plurality of users.

9. The exercise management device of claim 1, wherein said motion sensor means is connected to a training bicycle.

10. The exercise management device of claim 1, wherein said motion sensor means is connected to a pedometer.

11. The exercise management device of claim 1, wherein said vital statistics include the age, weight and sex of the user.

* * * * *